US010257676B1

(12) United States Patent
Mishra et al.

(10) Patent No.: US 10,257,676 B1
(45) Date of Patent: Apr. 9, 2019

(54) SYSTEMS AND METHODS FOR FACILITATING ONLINE MATCHING UTILIZING A WEARABLE DEVICE

(71) Applicant: EHARMONY, INC., Los Angeles, CA (US)

(72) Inventors: Arvind Mishra, Encino, CA (US); Vanessa Petrosky, Santa Monica, CA (US)

(73) Assignee: EHARMONY, INC., Los Angeles, CA (US)

( * ) Notice: Subject to any disclaimer, the term of this patent is extended or adjusted under 35 U.S.C. 154(b) by 0 days.

(21) Appl. No.: 15/697,390

(22) Filed: Sep. 6, 2017

Related U.S. Application Data

(63) Continuation of application No. 14/788,570, filed on Jun. 30, 2015, now Pat. No. 9,775,015.

(60) Provisional application No. 62/019,755, filed on Jul. 1, 2014.

(51) Int. Cl.
| | |
|---|---|
| *H04W 4/02* | (2018.01) |
| *H04M 1/725* | (2006.01) |
| *H04W 8/18* | (2009.01) |
| *G06F 17/30* | (2006.01) |
| *G06F 3/0488* | (2013.01) |
| *H04W 4/21* | (2018.01) |

(52) U.S. Cl.
CPC ............ *H04W 4/21* (2018.02); *G06F 3/0488* (2013.01); *G06F 17/3087* (2013.01); *G06F 17/30867* (2013.01); *H04M 1/7253* (2013.01); *H04M 1/72569* (2013.01); *H04M 1/72572* (2013.01); *H04W 4/023* (2013.01); *H04W 8/183* (2013.01)

(58) Field of Classification Search
CPC ..... H04W 4/023; H04W 4/206; H04W 8/183; H04W 4/21; G06F 3/0488; G06F 17/30867; G06F 17/3087; H04M 1/7253; H04M 1/72569; H04M 1/72572
USPC .... 455/456.1–457, 404.2, 414.1–414.2, 421; 340/539.13
See application file for complete search history.

(56) References Cited

U.S. PATENT DOCUMENTS

| | | | |
|---|---|---|---|
| 6,735,568 | B1 | 5/2004 | Buckwalter et al. |
| 7,454,357 | B2 | 11/2008 | Buckwalter et al. |
| 8,332,418 | B1 | 12/2012 | Giordani et al. |
| 8,606,297 | B1 * | 12/2013 | Simkhai ................ H04W 4/02 455/456.2 |
| 8,635,167 | B2 | 1/2014 | Buckwalter et al. |
| 8,958,778 | B2 | 2/2015 | Lewis et al. |
| 8,984,065 | B2 | 3/2015 | Carter et al. |
| 2008/0140640 | A1 * | 6/2008 | Raff ........................ H04L 29/06 |
| 2008/0154899 | A1 * | 6/2008 | Carmony ............... G06Q 50/22 |
| 2009/0100037 | A1 * | 4/2009 | Scheibe .............. G06F 17/3087 |
| 2013/0151372 | A1 | 6/2013 | Liu |
| 2014/0159894 | A1 | 6/2014 | Tropper et al. |
| 2014/0172893 | A1 | 6/2014 | Carter |

(Continued)

*Primary Examiner* — Michael Y Mapa
(74) *Attorney, Agent, or Firm* — One LLP; Joseph K. Liu

(57) ABSTRACT

A computer-based system for presenting interpersonal relationship analysis and recommendations to a first user on a wearable device including a matching server system that generates, correlates, and determines whether match profile data for the first user indicates that nearby users include any potential matches for the first user before displaying an alert on the wearable device indicating the potential matches location if there is a mutual interest between the first user and the potential match.

9 Claims, 9 Drawing Sheets

(56) References Cited

U.S. PATENT DOCUMENTS

| | | |
|---|---|---|
| 2014/0280532 A1* | 9/2014 | MacNiven ............ H04L 67/306 709/204 |
| 2015/0011204 A1 | 1/2015 | Seo et al. |
| 2015/0039616 A1 | 2/2015 | Rolston et al. |
| 2015/0359436 A1 | 12/2015 | Shim et al. |

* cited by examiner

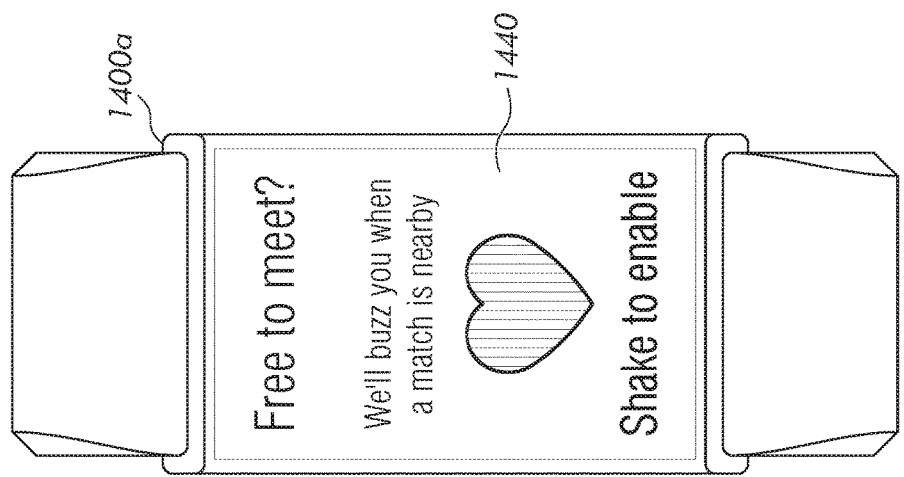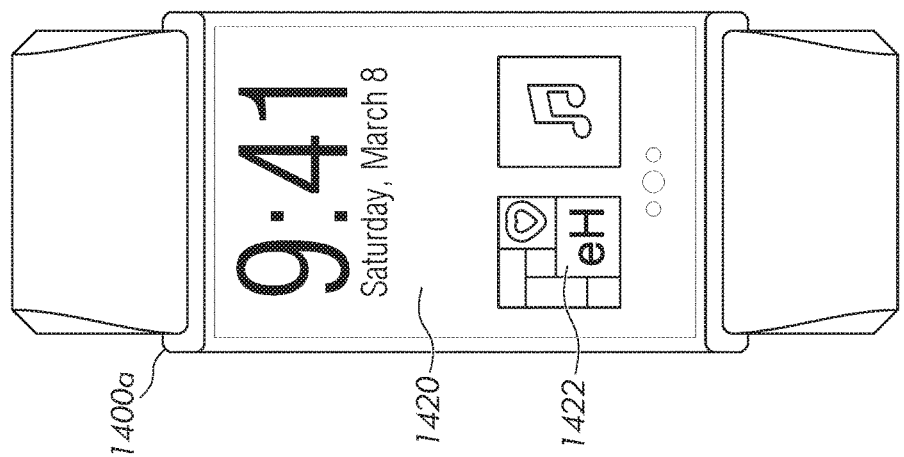
FIG. 2

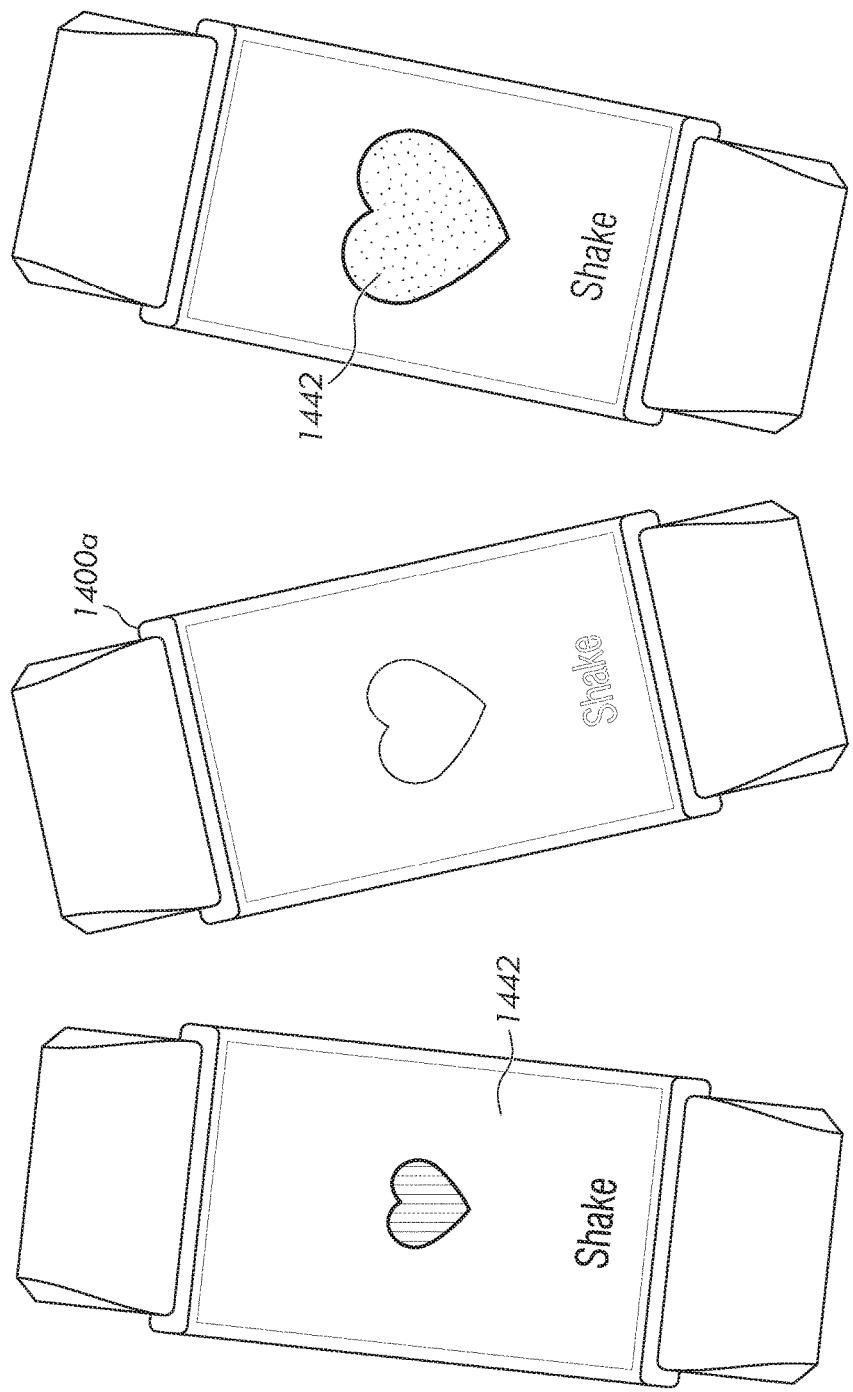

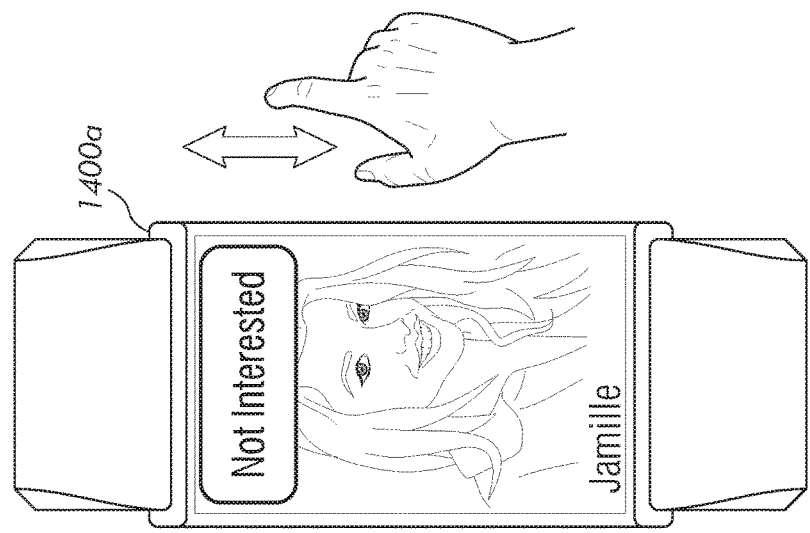
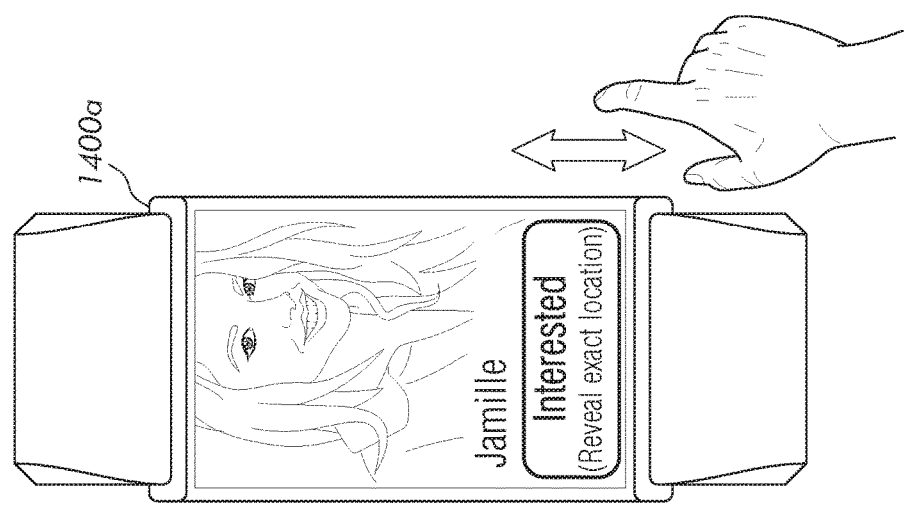
FIG. 8

SYSTEMS AND METHODS FOR FACILITATING ONLINE MATCHING UTILIZING A WEARABLE DEVICE

CROSS-REFERENCES TO RELATED APPLICATIONS

This application is a continuation of U.S. application Ser. No. 14/788,570, filed Jun. 30, 2015, which claims the benefit of U.S. Provisional Application No. 62/019,755, filed Jul. 1, 2014, both of which are incorporated by reference herein in their entireties and for all purposes.

FIELD OF THE INVENTION

The field of the invention relates to systems and methods for facilitating online matching utilizing a wearable device.

BACKGROUND OF THE INVENTION

Research has shown that the success of human interpersonal relationships depends on complex interactions between a large number of variables including, but not limited to, personality, socioeconomic status, religion, appearance, ethnic background, energy level, education, interests and appearance. Matching services have developed effective systems that analyze these variables to identify and match people who have the potential to establish a successful relationship. A well-known example of such a service is eHarmony, Inc. (which can be found at www.eharmony.com). A matching service generally collects and stores data to create a "profile" for each user. The profile includes a number of factors potentially relevant to establishing a successful interpersonal relationship with that user. The matching service then correlates that user's profile with others in its database to assess which profiles are compatible, i.e., which users have the potential for a successful relationship when matched. The potential matches are then presented to the user along with means for initiating and/or facilitating the interpersonal relationship between the user and the potential match.

Recently, there has been a movement towards wearable technology, which includes clothing and accessories incorporating computer and advanced electronic technologies. Wearable technology has been developed for general or special purpose information technologies and media development. Wearable computers, for example, are especially useful for applications that require more complex computational support than just hardware encoded logic, i.e. applications that require the ability to operate software applications and computer programs. Some examples of wearable computers include wearable computer watch-like devices, such as the MOTO360 by Motorola, the Gear 2 by Samsung, the Apple iWatch, and the Eurotech ZYPAD, as well as optical head-mounted displays, such as the Google Glass.

Accordingly, a wearable technology device for facilitating interpersonal relationships may be desirable.

SUMMARY OF THE INVENTION

The field of the invention relates to systems and methods for facilitating online matching utilizing a wearable device.

In a preferred embodiment, the system includes a computer-based system for presenting interpersonal relationship analysis and recommendation to a first user, comprising: a matching server system configured to: (a) generate match profile data for a plurality of users, the match profile data including user location data; and (b) correlate the match profile data of the first user with the match profiles of nearby users selected from the plurality of users based on user location data; (c) determine from the correlation whether the nearby users includes a potential match for the first user; a user wearable computing device operatively coupled to the matching server system, wherein the user wearable computing device comprises: a user interface, including a visual display; a controller, including a processor and a non-transitory medium containing a sequence of instructions that when executed by the processor causes the controller to execute the following operations if matching server system determines that the nearby users includes a potential match: (a) display an alert via the user interface indicating the nearby users includes a potential match; (c) selectively receive the location data of the potential match, based on the mutual interest between the first user and the potential match; and (d) display on the visual display information the location of the potential match relative to the location data of the first user.

Other systems, methods, features and advantages will be apparent to one of ordinary skill in the art from the following figures and detailed description, which illustrate, by way of example, the principles of the present invention.

BRIEF DESCRIPTION OF THE DRAWING(S)

Illustrated in the accompanying drawing(s) is at least one of the best mode embodiments of the present invention. In such drawing(s):

FIG. 2 is an exemplary diagram of a system for facilitating online matching utilizing a wearable device in accordance with a preferred embodiment of the present invention;

FIG. 3 is an exemplary diagram of a system for facilitating online matching utilizing a wearable device in accordance with a preferred embodiment of the present invention;

FIG. 8 is an exemplary diagram of a system for facilitating online matching utilizing a wearable device in accordance with a preferred embodiment of the present invention;

DETAILED DESCRIPTION OF THE PREFERRED EMBODIMENTS

The above described drawing figures illustrate the invention in at least one preferred, best mode embodiment, which is further defined in detail in the following description.

Those having ordinary skill in the art may be able to make alterations and modifications to what is described herein without departing from its spirit and scope. Therefore, it should be understood that what is illustrated is set forth only for the purposes of example and should not be taken as a limitation on the scope of the present system and method.

Figure 1:
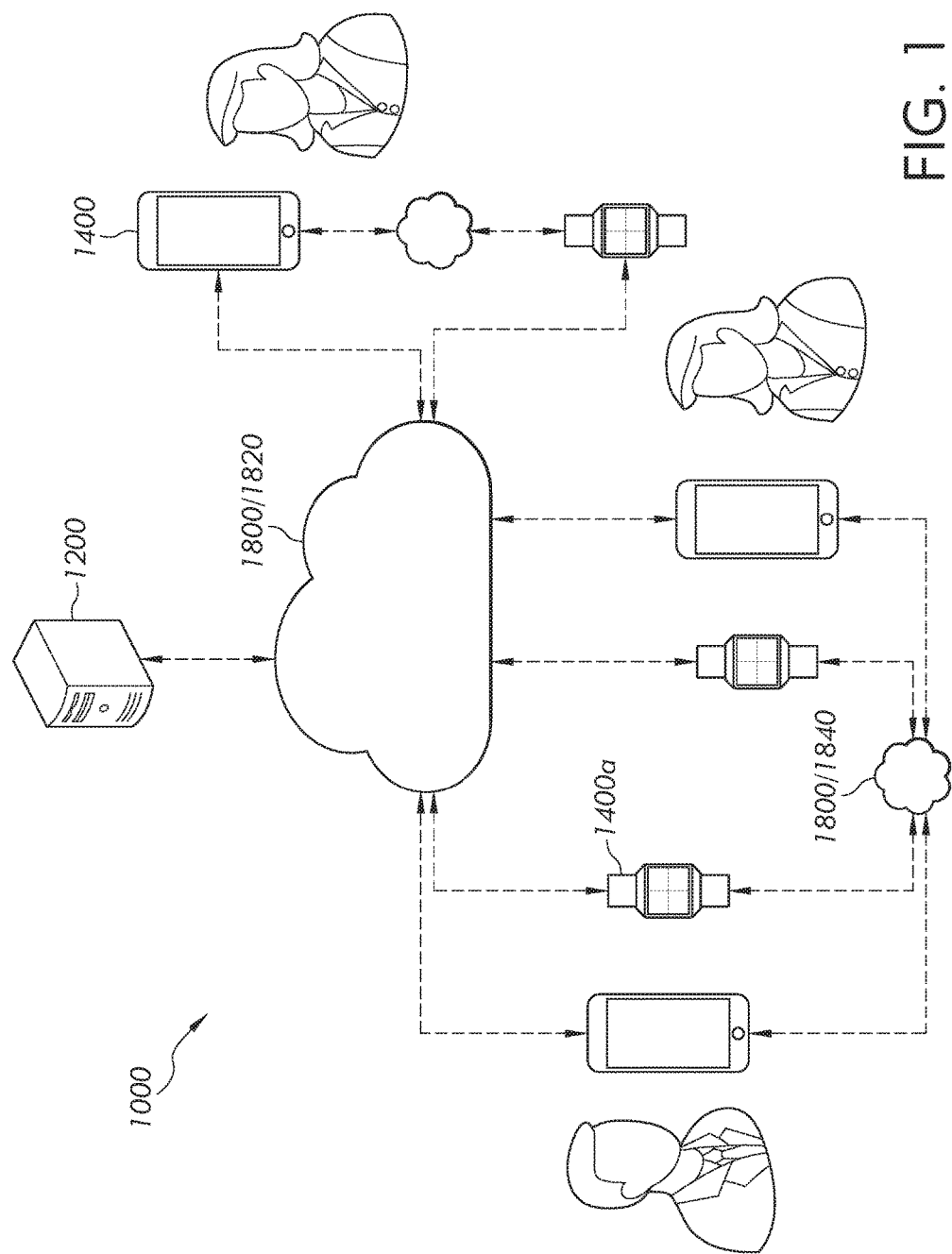
FIG. 1 is an exemplary diagram of a system for facilitating online matching utilizing a wearable device in accordance with a preferred embodiment of the present invention.

FIG. 1 illustrates an exemplary computer-based matching system 1000 in accordance with a preferred embodiment of the present invention. The system generally includes a matching server system 1200, which may distributed on one or more physical servers, each having processor, memory, an operating system, and input/output interface, and a network interface all known in the art, and one or more mobile user interface devices 1400, including at least one wearable user interface device 1400a, coupled to a network 1800, which may be a public network 1820, such as the Internet or other public wireless network, and/or a private network 1840, such as a personal-area-network or other private or semi-private wireless network.

The matching server system generally includes a computer application designed to match an end user with a potential match with whom there is a likelihood of a successful interpersonal relationship. In general, the matching server system is designed to be utilized by an online dating service in matching clients. Details of exemplary matching server systems are also described in the following patents, publications and/or patent applications: U.S. Pat. No. 6,735,568, issued to Galen Buckwalter et. al. on May 11, 2004; U.S. Pat. No. 7,454,357, issued to Galen Buckwalter et. al. on Nov. 18, 2008; U.S. Pat. No. 8,332,418, issued to Patrick Giordani et. al. on Jul. 14, 2008; U.S. Pat. No. 8,635,167, issued to Galen Buckwalter et. al. on Jan. 21, 2014; U.S. patent application Ser. No. 13/564,349 filed on Aug. 1, 2012; U.S. patent application Ser. No. 13/718,981 filed on Dec. 18, 2012; U.S. patent application Ser. No. 13/802,188, filed on Mar. 13, 2013, U.S. patent application Ser. No. 14/279,031 filed on May 15, 2014, each of which is hereby incorporated by reference in its entirety.

In general, to identify potential matches, i.e. other users with whom there is a likelihood of a successful interpersonal relationship, each user establishes a profile that includes data and/or factors potentially relevant to establishing a successful interpersonal relationship for that user. The data and/or factors may be indicative of qualities desired of the potential match and/or desirable as the potential match—i.e., the factors preferably indicative of suitability and/or attraction between users. These factors are generated from data collected from the user. For example, users of the system may be required to provide the following information: one or more photos, age, what age they would like their potential match to be, zip code, occupation, a description of their life goal, the type of relationship they are seeking (e.g. friendship, casual dating, long term relationship, marriage) and other information which may be used to describe the users' personality, values, beliefs and preferences. This information may then be used to generate and/or update the user's profile, which may contain one or more factors generated based on the provided information. Other information may be used to generate and/or update the user's profile, including for example, analyses of prior relationships, responses to provided stimuli, third-party feedback from other users, and other such information. The profiles may be stored in a database and organized by the user's profile identification.

In the process of identifying potential matches for the user, a match engine or the like may query the user's profile by its respective profile identification, and algorithmically correlate the user's profile with other profiles to calculate the likelihood of a successful interpersonal relationship if matched, i.e. whether the correlated users are potential matches for each other. This correlation preferably involves calculating a compatibility and/or mutual attraction score indicating whether and/or to what extent the correlated users are potential matches for each other. The match engine then presents profile information of the potential match, which may include profile data (e.g. photo, age, occupation, political affiliation, etc.), to the user. The respective users may then determine whether to follow-up on the suggested match. Preferably, this follow-up includes initiating and/or otherwise allowing varying degrees of further contact between the respective users of the grouping in the form of, for example, e-mail, electronic messaging, video chat, telephone, or in-person meeting.

FIGS. 2-9 illustrate exemplary wearable user interface devices (hereinafter referred to as "wearable" or "wearables") in accordance with a preferred embodiment of the present invention. In general, the wearable preferably comprises a wearable computing device operable to execute a computer application designed to cause the wearable to present profile information of the potential match to the end user in accordance with the matching server system described above. Accordingly, the wearable may include a processor, a memory, an operating system, and input/output interface, and a network interface, all known in the art, and operable alone or in combination as necessary to implement functionalities described herein.

In some embodiments, the wearable may be configured to alert the user when a potential match is nearby, i.e. within a predetermined geographic proximity, of the user, and enable to user to follow-up on the suggested match. The wearable may communicate with the matching server system via the network interface, including communicating the geographic location of the user. The geographic location of the user may then be utilized by the matching server system to establish a subset of other 'available' users within a predetermined geographic proximity to the user, i.e. a nearby 'dating pool,' from which the matching server system may determine whether a potential match is nearby according to the algorithmic correlation discussed above. This 'dating pool' may include other users utilizing wearables, other users utilizing other types of mobile user interface devices operating the computer application, such as smart phones, personal-data-assistants, and the like, and/or other users utilizing a combination thereof.

Accordingly, the wearable may comprise a proximity sensor for sensing whether the potential match is within the predetermined range of the user, and a message generator, for generating a message for alerting the user that the potential match is nearby. The message may be visual, audio, tactile or any combination thereof, and may be communicated to the user via the input/output interface 1420 of the wearable, which preferably includes a touch screen display 1420 and an audio speaker (not shown). The proximity sensor may comprise a GPS unit operative to communicate user location data to the matching server system via the network.

Figure 10:
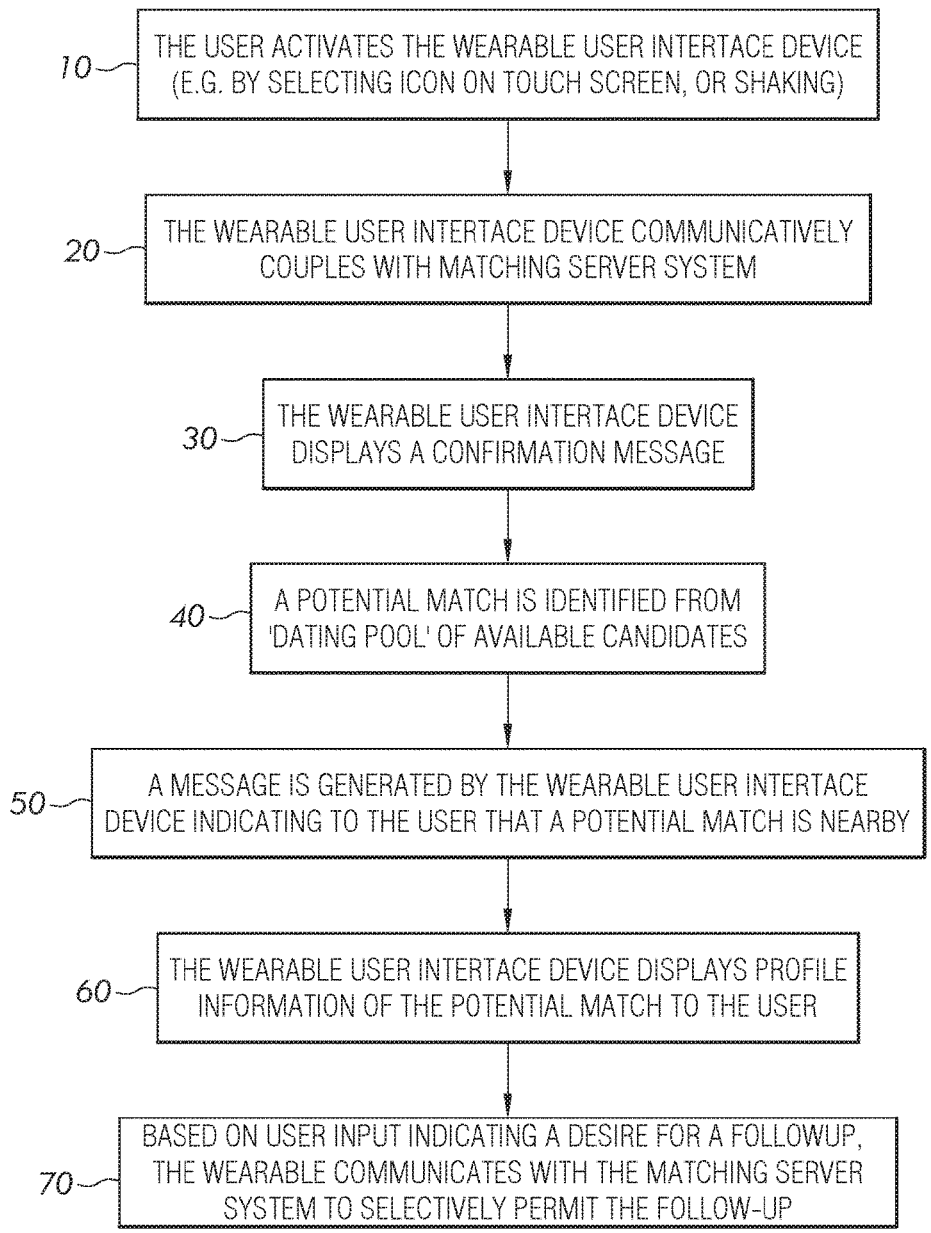
FIG. 10 is an exemplary flow chart illustrating exemplary steps of the present invention.

As illustrated in FIG. 2, the wearable input/output interface may operate to enable the user to activate the computer application and associated functionalities of thereof. For example, as shown in FIG. 2, the user may activate the computer application via selecting an icon 1422 displayed on the touch screen interface. Step 10 of FIG. 10 illustrates this step in connection with an exemplary flow-chart illustrating a mode of operation according to various embodiments of the present invention.

As further illustrated in FIGS. 2 and 3, the selection of the icon may cause the touch screen to display a confirmation instruction 1440, such as "shake to activate." Upon the user performing the instructed action(s), the wearable may confirm activation of the computer application and associated functionalities. As illustrated in Step 20 of the flow-chart of FIG. 10, such activation preferably includes communicatively coupling the wearable to the matching server system. In some embodiments, the user's performance of the instructed action, e.g. shaking the wearable, is sensed by the wearable via a sensor, and in response thereto, the wearable provides an indication, for example, a visual indication 1442, to the user that the wearable has sensed the user performing the instructed action. For example, as shown in FIGS. 2 and 3, the wearable may instruct the user to "shake" the wearable in order to confirm he/she desires activation of the computer application. Upon the user shaking the wearable, the wearable may display a visually represented heart icon that pulses and grows as the user continues to shake the wearable, culminating in the activation of the computer application and associated functionalities. This confirmation/feedback functions as a control against unintentional activation of the computer application.

Figure 4:
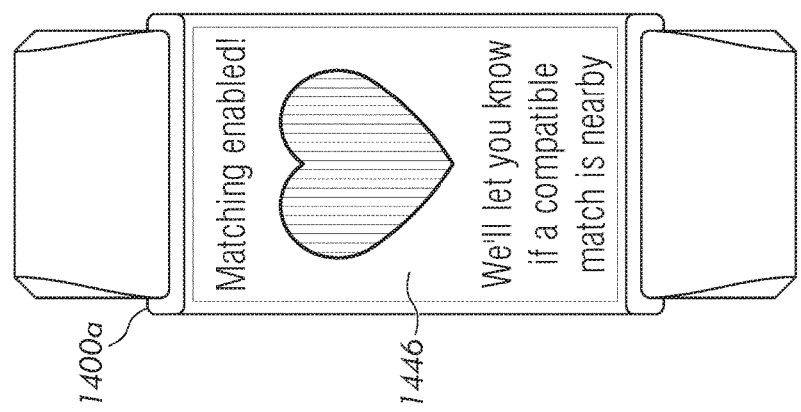
FIG. 4 is an exemplary diagram of a system for facilitating online matching utilizing a wearable device in accordance with a preferred embodiment of the present invention.

As illustrated in FIG. 4, in accordance with at least one embodiment, the wearable displays a confirmation message 1446 to the user indicating that the computer application and associated functionality is enabled. Step 30 of FIG. 10 illustrates this step in connection with an exemplary flow-chart illustrating a mode of operation according to various embodiments of the present invention. In connection with this message, the wearable may transmit via the network, the location data of the user as well as indicate to the matching server system that the user is 'available' to be part of a 'dating pool,' consisting of nearby other users, as discussed above. Step 40 of FIG. 10 illustrates this step in connection with an exemplary flow-chart illustrating a mode of operation according to various embodiments of the present invention.

In some embodiments, the number of users in the 'dating pool' is a function of the radial distance from the user within which the matching server system will search for potential matches, and vise versa. Preferably, each of these variables is adjustable by the user, and/or by an administrator of the matching server system. For example, via the input/output interface, the user may—as a 'settings' control—adopt a setting wherein the 'dating pool' is defined by a specific, predetermined radius. In other words, the 'dating pool' consists of those other 'available' users within an n-mile radius of the user. As an alternative example, the 'dating pool' may be set to consist of the nearest m number of other users. It should be noted that as the GPS location data—which preferably is periodically updated—and/or the 'availability' of other users change, the composition of the 'dating pool' likewise changes to reflect current circumstances. It should be noted that the matching server may include, as part of the 'dating pool,' other users utilizing wearables, other users utilizing other types of mobile user interface devices operating the computer application, such as smart phones, personal-data-assistants, and the like, and/or other users utilizing a combination thereof.

Figure 5:
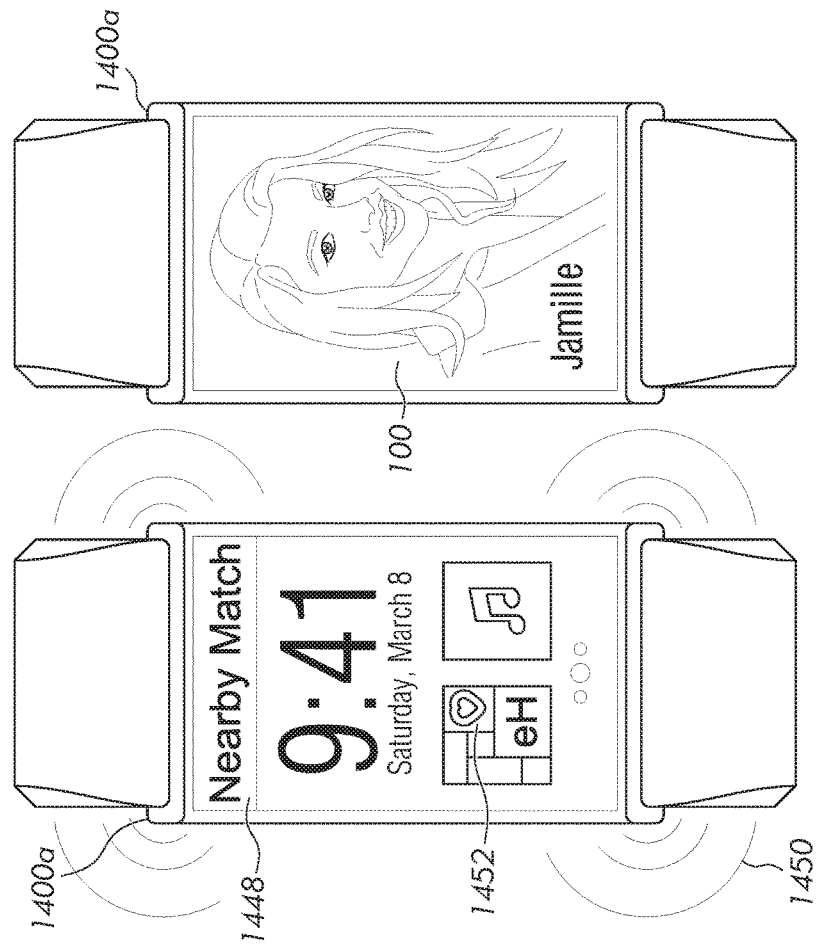
FIG. 5 is an exemplary diagram of a system for facilitating online matching utilizing a wearable device in accordance with a preferred embodiment of the present invention.

FIG. 5 illustrates a wearable, according to at least one embodiment, alerting the user that a potential match is nearby. As discussed above, the proximity sensor of the wearable may operate to sense whether the potential match is nearby, i.e. within the 'dating pool' of the user. In some embodiments, this may comprise comparing the GPS location data of the user and other users, as well as correlating the user's profile with the profiles of other users, as discussed above.

As further illustrated in FIG. 5, the message generator may generate a message for alerting the user that the potential match is nearby. Step 50 of FIG. 10 illustrates this step in connection with an exemplary flow-chart illustrating a mode of operation according to various embodiments of the present invention. The message may be visual, audio, tactile or any combination thereof, and may be communicated to the user via the input/output interface of the wearable, which preferably includes a touch screen display and an audio speaker. In some embodiments, such as shown in FIG. 5, for example, the message includes a textual indication 1448 that there is a "nearby match," as well as an audio indication, such as 'beep,' 'chime' or other sound, of the nearby potential match, and a tactile indication 1450, e.g. vibration, of the same. Preferably, the message is an interactive message comprising one or more user selectable portions 1452 that, for example, the user may select via touching the selectable portions displayed on the touch screen.

Figure 6:
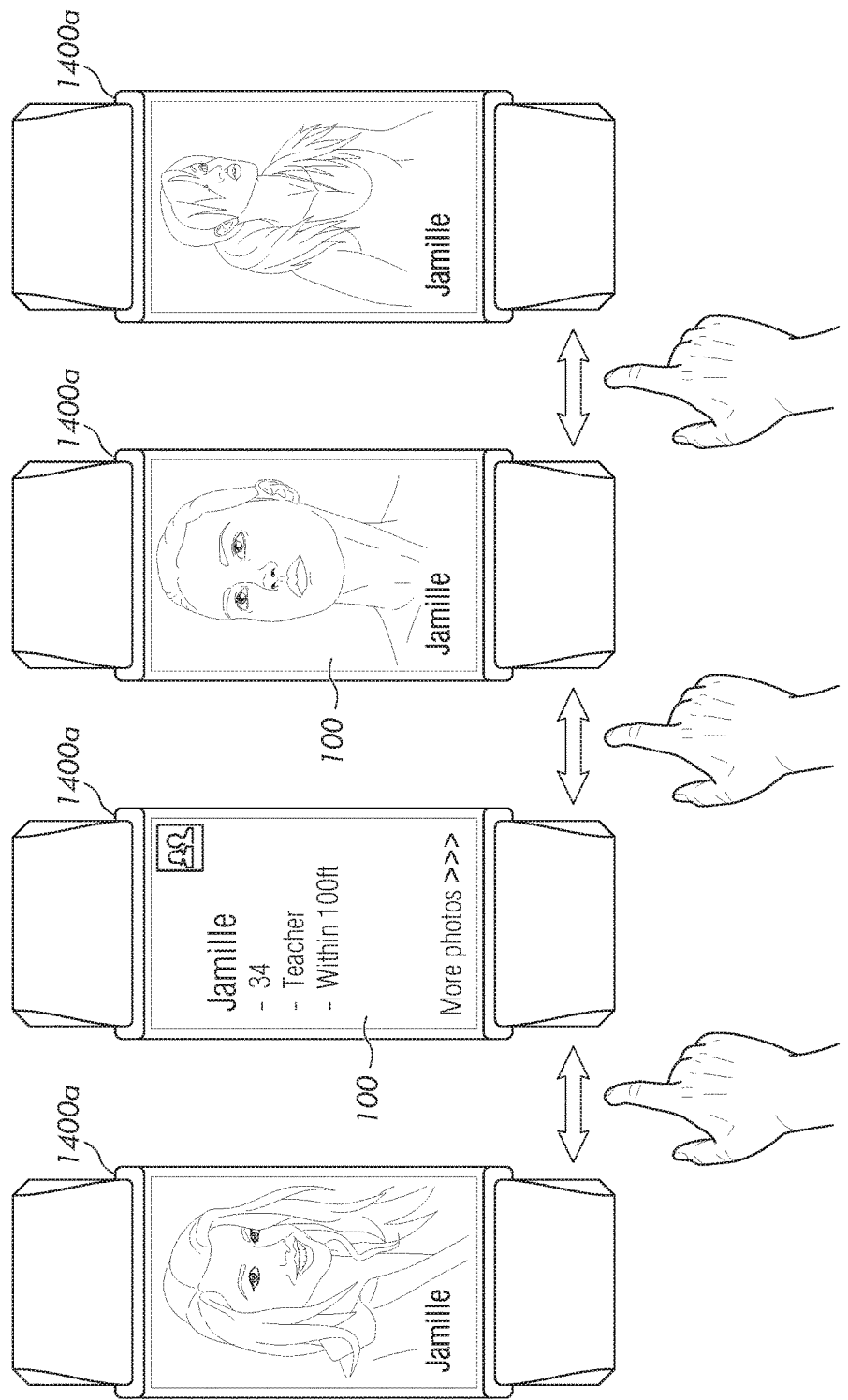
FIG. 6 is an exemplary diagram of a system for facilitating online matching utilizing a wearable device in accordance with a preferred embodiment of the present invention.

In response to the user selection of the selectable portion of the message, the wearable preferably displays profile information 100 of the potential match. FIG. 5 illustrates, for example, the wearable displaying a name and profile photograph of a potential match. In some embodiments, the user may—via the input/output interface—selectively view alternative profile information of the potential match. For example, as shown in FIG. 6, upon 'swiping' the touch screen displaying a photograph of the potential match, the user can cause the wearable to display the potential matches age, occupation and residence location, as well as additional photographs. Step 60 of FIG. 10 illustrates this step in connection with an exemplary flow-chart illustrating a mode of operation according to various embodiments of the present invention.

Figure 7:
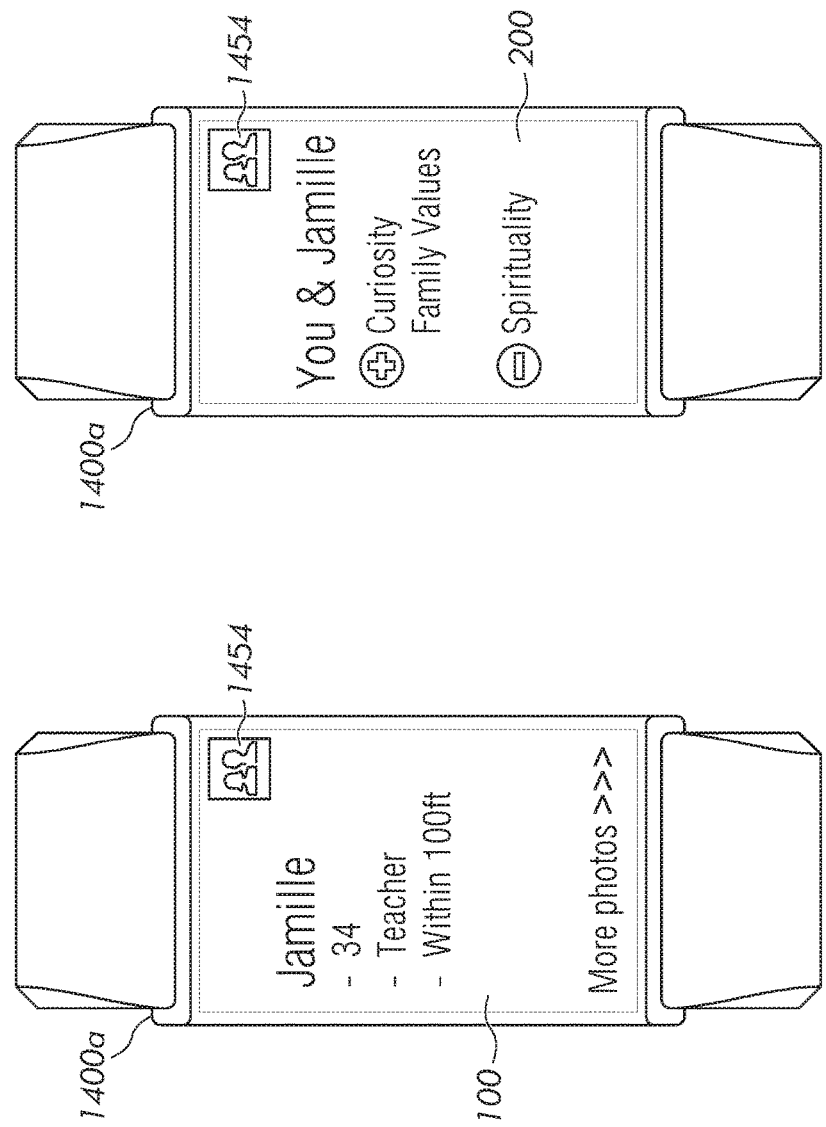
FIG. 7 is an exemplary diagram of a system for facilitating online matching utilizing a wearable device in accordance with a preferred embodiment of the present invention.

As illustrated in FIG. 7, there is preferably displayed a compatibility icon 1454 that is selectable by the user to cause the wearable to display additional compatibility information 200, including but not limited to compatible factors, as determined by the matching server system, of the user and the potential match, including shared personality traits, desires, motivations, hobbies, etc. In some embodiments, the 'compatibility information' also includes factors where the user and the potential match are not compatible, as determined by the matching server system. As with the displayed profile information, the user may 'swipe' through the displayed compatibility information so as to cause the wearable to display further compatibility information and/or profile information.

As illustrated in FIG. 8, in some embodiments, the wearable may further enable the user to indicate he/she is interested in following-up on the suggested match. Preferably, this follow-up includes initiating and/or otherwise allowing varying degrees of further contact between the respective users of the grouping in the form of, for example, e-mail, electronic messaging, video chat, telephone, or in-person meeting. In at least one embodiment, as shown in FIG. 8, the user indicates he/she is interested in following-up on the suggested match by swiping the touch screen of the wearable. If the user indicates an interest in following-up, the matching server system may enable the potential match—if there is mutual interest—to view the user's current location data, and vice versa. In this manner, the user and the potential match may follow-up on the suggested match. Step 70 of FIG. 10 illustrates this step in connection with an exemplary flow-chart illustrating a mode of operation according to various embodiments of the present invention.

Figure 9:
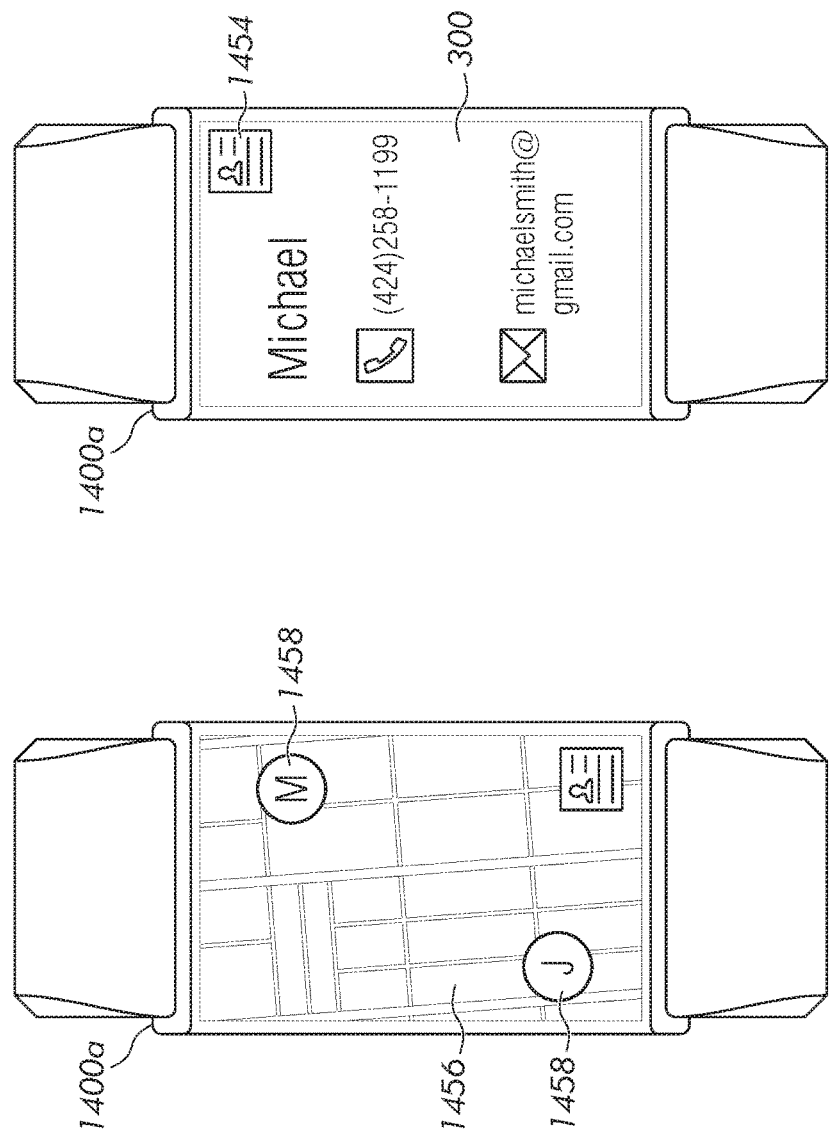
FIG. 9 is an exemplary diagram of a system for facilitating online matching utilizing a wearable device in accordance with a preferred embodiment of the present invention.

As reflected in FIG. 9, in some embodiments, if there is mutual interest indicated by the user and the potential match, the wearable may display a map 1456 with icons 1458 indicating the respective geographic locations of the user and the potential match. In some embodiments, the map may further indicate potential meeting or date venues based on the profile information of both parties. In other words, the map may provide meeting place suggestions that, based on the respective profile information, may appeal to both the user and the potential match so as to further promote the likelihood of a successful interpersonal interaction. Additionally, in some embodiments, the wearable may enable the user to send his/her contact information 300, including but not limited to email address, telephone number, etc., to the potential match. In this way, the wearable further facilitates following-up.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The scope of this description is to be interpreted only in conjunction with the appended claims and it is made clear, here, that the named inventor believes that the claimed subject matter is what is intended to be patented.

What is claimed is:

1. A computer-based system for presenting interpersonal relationship analysis and recommendation to a first user, comprising:
    a matching server system configured to:
        (a) generate match profile data for a plurality of users comprising the first user and a plurality of nearby users, the match profile data including user location data; and
        (b) correlate the match profile data of the first user with the match profiles of nearby users selected from the plurality of users based on user location data;
        (c) determine from the correlation whether the nearby users include a potential match for the first user;
    a user wearable computing device operatively coupled to the matching server system, wherein the user wearable computing device comprises:
        a user interface, including a visual display;
        a controller, including a processor and a non-transitory medium containing a sequence of instructions that when executed by the processor causes the controller to execute the following operations when the matching server system determines that the nearby users include a potential match:
            (a) indicate via the user interface whether the nearby users include a potential match;
            (b) selectively display the profile data of the potential match; and
            (c) selectively retrieve the location data of the potential match, based on the mutual interest between the first user and the potential match, and display the location of the potential match relative to the location data of the first user,
    wherein the displayed location includes a map including a geo-positional location of the potential match in relation to the geo-positional location of the user and one or more indications of potential meeting venue based on the profile information of the first user and the potential match;
    wherein the controller further displays a compatibility icon that is selectable by the first user to cause the user wearable computing device to display a compatibility information between the first user and the potential match; and
    wherein the compatibility information includes one or more factors where the first user and the potential match are compatible, and one or more other factors where the first user and the potential match are not compatible, the one or more factors grouped in a first list represented by a first symbol, and the one or more other factors grouped in a second list represented by a second symbol, as determined by the matching server system.

2. The system of claim 1, wherein the user wearable computing device further comprises a location sensor for providing location data to the matching server system.

3. The system of claim 2, wherein the location sensor comprises a proximity sensor for sensing whether one or more of the plurality of users are within a predetermined range of the proximity sensor.

4. The system of claim 2, wherein whether one of the plurality of users is a nearby user is determined based on whether the one of the plurality of users is within a predetermined radial distance of the user.

5. The system of claim 1, wherein the location data is periodically updated based on the location of the associated user wearable computing device.

6. The system of claim 1, wherein selective displaying the profile information of the potential match comprises displaying additional profile information in response to the user swiping the touch screen display.

7. The system of claim 1, wherein the displayed profile information includes information indicating whether the potential user satisfies one or more compatibility factors of the user.

8. The system of claim 1, wherein the user interface includes a touch screen, and wherein an indication of a desire for a follow-up on the potential match is indicated by the first user swiping the touch screen in a first direction, and an indication of lack of the desire for the follow-up is indicated by the first user swiping the touch screen in a second direction.

9. The system of claim 1, wherein swiping through the displayed compatibility information causes the user wearable computing device to display further compatibility information, profile information, or both.

* * * * *